US009940905B2

(12) United States Patent
Maiya et al.

(10) Patent No.: US 9,940,905 B2
(45) Date of Patent: Apr. 10, 2018

(54) CLOCK RATE ADJUSTMENT FOR PROCESSING UNIT

(71) Applicant: QUALCOMM Incorporated, San Diego, CA (US)

(72) Inventors: Mohan Maiya, San Diego, CA (US); Maurice Franklin Ribble, Lancaster, MA (US); Suman Tatiraju, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 14/612,425

(22) Filed: Feb. 3, 2015

(65) Prior Publication Data

US 2016/0225348 A1     Aug. 4, 2016

(51) Int. Cl.
| G06T 1/20 | (2006.01) |
| G06T 15/00 | (2011.01) |
| G06F 1/08 | (2006.01) |
| G06F 1/32 | (2006.01) |
| G09G 5/18 | (2006.01) |
| G06F 9/38 | (2018.01) |
| G09G 5/36 | (2006.01) |

(52) U.S. Cl.
CPC ............... *G09G 5/18* (2013.01); *G06F 1/08* (2013.01); *G06F 1/3203* (2013.01); *G06F 1/324* (2013.01); *G06F 1/3206* (2013.01); *G06F 9/3869* (2013.01); *G06T 1/20* (2013.01); *G06T 15/005* (2013.01); *G09G 5/363* (2013.01); *G09G 2360/08* (2013.01); *Y02B 60/1217* (2013.01)

(58) Field of Classification Search
CPC ....... G06T 1/20; G06T 15/005; G06F 9/3867; G06F 9/3877; G06F 1/08; G06F 1/3203; G05B 5/01
USPC ........... 345/501, 522; 712/200, 203; 700/46; 713/500, 501, 600
See application file for complete search history.

(56) References Cited

U.S. PATENT DOCUMENTS

| 8,650,423 B2 | 2/2014 | Li et al. |
| 8,695,008 B2 | 4/2014 | Regini et al. |
| 2002/0099964 A1 | 7/2002 | Zdravkovic |
| 2008/0079732 A1 | 4/2008 | Park et al. |
| 2009/0313629 A1 | 12/2009 | Azuma |
| 2014/0063026 A1 | 3/2014 | Oh |

OTHER PUBLICATIONS

International Search Report and Written Opinion from International Application No. PCT/US2016/013045 dated Apr. 5, 2016, 16 pp.
Govil, et al., "Comparing Algorithm for Dynamic Speed-Setting of a Low-power CPU", Mobile Computing and Networking, Dec. 1995, pp. 13-25.

(Continued)

*Primary Examiner* — Ke Xiao
*Assistant Examiner* — Andrew Shin
(74) *Attorney, Agent, or Firm* — Shumaker & Sieffert, P.A.

(57) ABSTRACT

Techniques are described in which a processor determines an expected performance level of a graphics processing unit (GPU) based on an amount of commands the GPU is to execute. The processor outputs information indicating the performance level, and the GPU adjusts its clock rate prior to execution of the commands that were used to determine the performance level.

12 Claims, 4 Drawing Sheets

(56) References Cited

OTHER PUBLICATIONS

Response to Written Opinion dated Apr. 5, 2016, from International Application No. PCT/US2016/013045, dated Dec. 1, 2016, 6 pp.
Second Written Opinion from International Application No. PCT/US2016/013045, dated Jan. 11, 2017, 10 pp.
Reply to Second Written Opinion from International Application No. PCT/US2016/013045, dated Jan. 11, 2017, which was filed on Feb. 28, 2017, 5 pp.
International Preliminary Report on Patentability from corresponding PCT Application Serial No. PCT/US2016/013045 dated May 3, 2017 (21 pages).

CLOCK RATE ADJUSTMENT FOR PROCESSING UNIT

TECHNICAL FIELD

This disclosure relates to clock rate adjustment, and more particularly, to clock rate adjustment of a graphic processing unit (GPU).

BACKGROUND

The rate at which processing units, such as graphics processing units (GPUs), execute operations is based on a frequency of a clock signal (i.e., clock rate). The faster the clock rate, the faster the processing unit executes operations. Conversely, the slower the clock rate, the slower the processing unit executes operations.

SUMMARY

In general, the disclosure describes techniques for proactively adjusting a frequency of a clock signal that sets the rate at which a processing unit executes operations based on information indicating a performance level of the processing unit, where the performance level is based on an estimated or given amount of commands to be executed by the processing unit prior to the processing unit executing the commands. For example, a first processing unit (e.g., a central processing unit (CPU)) may determine whether there in an expected increase or decrease in the performance level of a second processing unit (e.g., a graphics processing unit (GPU)). The first processing unit may output information indicating an increase or decrease in the expected performance level of a second processing unit based on the determination. The second processing unit receives such information and proactively adjusts the frequency of a clock signal upward (i.e., increases the frequency) for increased performance or downward (i.e., decreases the frequency) for decreased performance based on the received information (e.g., adjusts the frequency of the clock signal before the second processing unit executes the commands).

In this way, the second processing unit can timely execute commands by the first processing unit causing the second processing unit to adjust the frequency of the clock signal upward when there are many commands that need to be executed within a set period of time. Also, where there are not as many commands that need to be executed within the period of time, the first processing unit can cause the second processing unit to adjust the frequency of the clock signal downward to conserve power.

In one example, the disclosure describes a method of clock rate determination comprising determining, with a processor, an amount of commands in a set of commands that a graphics processing unit (GPU) needs to execute within a set period of time, determining a clock rate for the GPU, prior to the GPU executing commands in the set of commands, based on the amount of commands in the set of commands, outputting information indicating the clock rate to the GPU, and instructing the GPU to execute one or more commands of the set of commands.

In one example, the disclosure describes a method of clock rate adjustment, the method comprising receiving, with a graphics processing unit (GPU), information indicating an expected performance level for the GPU to execute a set of commands, wherein the performance level is based on an amount of commands in the set of commands that the GPU is to execute within a set time period, determining a clock rate of the GPU based on the received information indicating the performance level prior to executing the commands of the set of commands, and executing one or more commands of the set of commands at the determined clock rate.

In one example, the disclosure describes a device for processing data comprising a processor, and a graphics processing unit (GPU). The processor is configured to determine an amount of commands in a set of commands that the GPU needs to execute within a set period of time, determine a clock rate for the GPU, prior to the GPU executing commands in the set of commands, based on the amount of commands in the set of commands, and output information indicating the clock rate to the GPU. The GPU is configured to receive the information indicating the clock rate, determine the clock rate from the received information, and execute one or more commands of the set of commands at the clock rate.

In one example, the disclosure describes a computer-readable storage medium having instructions stored thereon that when executed cause a processor to determine an amount of commands in a set of commands that a graphics processing unit (GPU) needs to execute within a set period of time, determine a clock rate for the GPU, prior to the GPU executing commands in the set of commands, based on the amount of commands in the set of commands, output information indicating the clock rate to the GPU, and instruct the GPU to execute one or more commands of the set of commands.

The details of one or more examples are set forth in the accompanying drawings and the description below. Other features, objects, and advantages will be apparent from the description, drawings, and claims.

DETAILED DESCRIPTION

Figure 1:
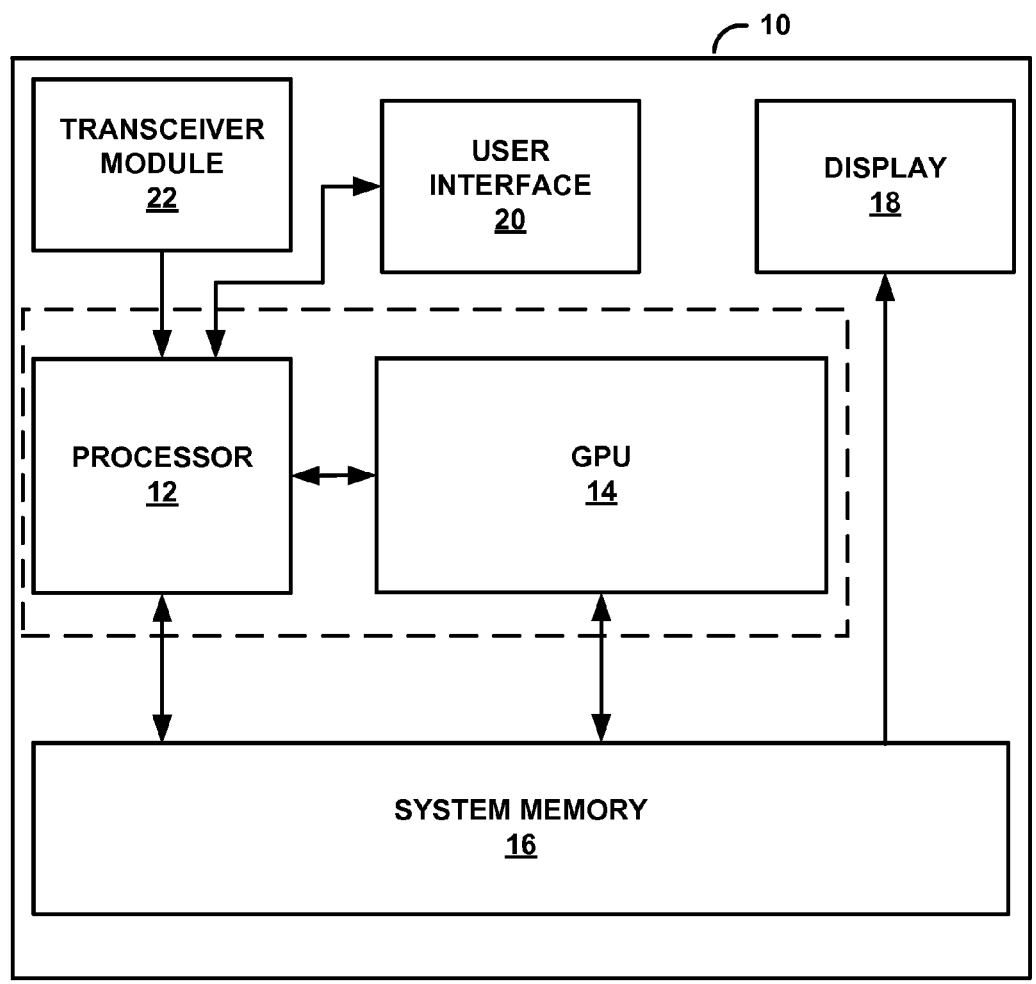
FIG. 1 is a block diagram illustrating an example device for processing data in accordance with one or more example techniques described in this disclosure.

A processing unit, such as a graphics processing unit (GPU), includes an internal clock that sets the rate at which the GPU processes instructions. A higher clock rate results in higher power consumption by the GPU, but allows the GPU to process more commands per second. A higher clock rate allows the GPU to provide higher performance, but at the cost of higher power consumption. A lower clock rate results in less power consumption by the GPU, but reduces the number of commands the GPU can process per second. A lower clock rate causes the GPU to provide lower performance, but at the benefit of lower power consumption.

This disclosure describes example ways in which to proactively adjust the clock rate of the GPU based on an expected performance level of the GPU, where the performance level is based on the amount of commands that are to be executed by the GPU (e.g., the actual amount of commands or an estimate of the amount of commands to be executed by the GPU). In some examples, the GPU adjusts the clock rate before the GPU executes the commands, and possibly even before the GPU receives the commands to be executed. In this manner, the GPU adjusts the clock rate for timely execution of the commands before executing the commands. Accordingly, the clock rate is set to the correct frequency before execution of the commands to allow the GPU to timely execute the commands.

For example, a central processing unit (CPU) may determine that the amount of commands to be executed by the GPU is expected to increase or decrease, and output information indicating an increase or decrease in the performance level. For instance, if the information indicating the performance level indicates an increase in performance because the amount of commands to be executed increased, the GPU may increase the clock rate to allow for timely execution. If the information indicating the performance level indicates a decrease in performance because the amount of commands to be executed decreased, the GPU may decrease the clock rate, thereby preserving power.

In some examples, the GPU may store a lookup table that indicates the clock rate needed for the performance level. In these examples, the GPU may increase or decrease the clock rate based on the mapping in the lookup table of the clock rate to the performance level. For example, the GPU may store a clock rate associated with maximum performance and a clock rate associated with minimum performance. If the GPU receives information indicating maximum performance, the GPU may increase the clock rate to the clock rate that corresponds to the maximum performance. If the GPU receives information indicating minimum performance, the GPU may decrease the clock rate to the clock rate that corresponds to the minimum performance.

The mapping of clock rate to performance level in the lookup table may be different for different types of GPUs. For instance, for some GPUs a mid-tier performance level may map to a clock rate of X Hz, while for some other GPUs a mid-tier performance level may map to a clock rate of Y Hz. Also, the maximum and minimum clock rates may be different for different types of GPUs, and would be reflected in the lookup tables of respective GPU types.

The performance level information need not necessarily be an absolute value, and may instead be a relative value. For instance, the GPU may receive information indicating that an increase in performance is needed, and the GPU may be configured to increase the clock rate by a determined amount (e.g., 5% or 10%). If the GPU receives information indicating a further increase in performance, the GPU may further increase the clock rate by the determined amount. The same holds true in reverse for when GPU receives information indicating a decrease in performance.

The determined amount by which the GPU increases or decreases the clock rate may be different for different types of GPUs. For instance, an increase of 5% in the clock rate may be insufficient for certain types of GPUs to satisfy the increased processing speed needed for timely execution, but an increase of 5% in the clock rate may be sufficient of other types of GPUs to satisfy the increase processing speed needed for timely execution.

Also, the determined amount by which the GPU increases or decreases performance may be based on a pre-configured, set value or may be value determined based on various factors. For instance, if the current clock rate is relatively high, and an increase in performance is expected, the amount by which the GPU increases the clock rate may be less than the amount by which the GPU would increase the clock rate if the current clock rate were relatively low and an increase in performance is expected. Also, the clock rate may not go higher than the maximum clock rate or less than the minimum clock rate. There may other criteria that define by how much to increase or decrease the clock rate.

In some examples described in this disclosure, a CPU executes an application that produces data (e.g., graphics data or non-graphics related data) to be processed by a GPU. In addition, the CPU generates commands to be executed by the GPU to process the data produced by the CPU. The commands to be executed by the GPU may be referred to as the GPU workload.

The CPU, via a graphics driver executing on the CPU, outputs information indicating a performance level for the GPU based on the GPU workload. For example, the application executing on the CPU or an operating system of the CPU may provide information to the graphics driver indicating the expected performance level of the GPU. The graphics driver then outputs the information indicative of the expected performance to the GPU prior to the GPU executing the commands that caused the CPU to determine that the performance level of the GPU should change.

The GPU receives, from the CPU, information indicating a performance level for the GPU to execute a set of commands, where the performance level is based on an amount of commands in the set of commands that the GPU is to execute within a set time period. The GPU increases or decreases its clock rate based on the received information indicating the performance level prior to executing the commands so that the GPU can execute the commands within a certain time period. The GPU may then execute one or more commands of the set of commands at the determined clock rate.

There may be various reasons why the GPU may need to execute commands within a certain time period (i.e., for timely execution of the commands). As one example, the GPU may need to output graphics data to achieve a frame rate of 60 frames per second, which means the GPU needs to render a frame within approximately 0.0167 seconds (1/60 equals 0.0167). If the amount of commands needed to execute for rendering a frame increases, resulting in a need for increased GPU performance in order to avoid dropping frames or "jank", the GPU may need to increase the clock rate so that the commands are timely executed to allow the GPU to render a frame every 0.0167 seconds. For example, if the GPU cannot execute the set of commands within 0.0167 seconds, the GPU may re-show the pervious frame after 0.0167 seconds (i.e., the same frame is shown for an interval of 0.0334 seconds), which results in the dropping the current frame.

If the amount of commands needed to execute for rendering a frame decreases, allowing for a decrease in GPU performance, the GPU may be able to decrease the clock rate since the GPU may not need such a high clock rate to execute the commands and achieve the frame rate. There may be other reasons that set the time period within which the GPU needs to execute the commands, and the techniques described in this disclosure are not limited to the above example of achieving a certain frame rate.

In examples described in this disclosure, the CPU may determine that there will be an increase or decrease in the amount of commands the GPU is to execute, and in response instruct the GPU to increase or decrease its performance level. In some cases, in addition to making a determination of the performance level of the GPU based on commands the GPU is to execute in the future, the CPU may already be configured to determine whether the GPU is to increase or decrease its clock rate based on a prior history of the amount of commands the GPU executed.

In some examples, the CPU may determine whether the GPU is to increase or decrease its clock rate (e.g., increase or decrease its clock rate) based on a determination of an amount of commands the GPU is to execute, and may cause (e.g., instruct) the GPU to increase or decrease the clock rate accordingly. In some examples, the CPU may utilize the determination of an amount of commands the GPU is to execute and the determination of the amount of commands the GPU previously executed.

As an example, the CPU may determine that based on commands that the GPU is to execute, which may be an estimate, the GPU should increase its clock rate to 500 MHz, and may instruct the GPU accordingly. Then, as the GPU executes commands, the CPU may determine that based on the prior history of the amount of commands the GPU actually executed, it may be possible for the clock rate to be 250 MHz. In some examples, the CPU may utilize both of these clock rate determinations to determine the actual clock rate of the GPU.

For instance, the CPU may determine a weighted average in which the CPU initially weighs the determination of the clock rate made based on commands to be executed more heavily and applies little to no weight to the determination of the clock rate made based on already executed commands. Accordingly, initially, the CPU may instruct the GPU to set the clock rate based predominately on the determination of the clock rate made based on commands to be executed. Then progressively, the CPU decreases the weighting of the determination of the clock rate made based on commands to be executed and increases the weighting of the determination of the clock rate made based on already executed commands. Accordingly, over time, the CPU may instruct the GPU to set the clock rate based predominately on the determination of the clock rate made based on already executed commands. In this manner, the CPU may output updated performance levels based on the history of commands executed by the GPU.

FIG. 1 is a block diagram illustrating an example device for processing data in accordance with one or more example techniques described in this disclosure. FIG. 1 illustrates device 10, examples of which include, but are not limited to, video devices such as media players, set-top boxes, wireless handsets such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC), such as a system-on-chip (SoC). For example, the IC may be formed as a processing chip within a chip package. In some examples, processor 12 and GPU 14 may be housed in different integrated circuits (i.e., different chip packages) such as examples where device 10 is a desktop or laptop computer with a separate graphics card that houses GPU 14. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of processing units.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

In some non-graphics related examples, processor 12 may generate data that is better suited to be processed by GPU 14. Such data need not necessarily be needed for graphics or display purposes. For instance, processor 12 may output data on which matrix operations need to be performed to GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10, and may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

For example, as described in more detail elsewhere in this disclosure, an application executing on processor 12 or an operating system of processor 12, executing on processor 12, may determine an amount of commands to be executed by GPU 14 (e.g., to be executed at a later time). The application or operating system may indicate to a graphics driver, executing on processor 12, information indicating a performance level of GPU 14 based on the amount of commands to be executed by GPU 14. The graphics driver may be configured to communicate information from processor 12 to GPU 14, and in some examples, may be configured in accordance with one of the example APIs (or some other API). The graphics driver may transmit the information indicating the performance level based on the amount of commands to be executed by GPU 14. GPU 14 may, in response, increase or decrease a clock rate of GPU 14 based on the received information indicating the performance level (e.g., proactively increase or decrease the clock rate prior to the execution and may be even prior to the reception of the commands). System memory 16 may store the instructions for the application, operating system, and the graphics driver.

In some examples, system memory 16 is a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18.

Transceiver module 22 may include circuitry to allow wireless or wired communication between device 10 and another device or a network. Transceiver module 22 may include modulators, demodulators, amplifiers and other such circuitry for wired or wireless communication.

In the techniques described in this disclosure, a first processing unit (e.g., processor 12) offloads certain tasks to a second processing unit (e.g., GPU 14). To offload tasks, processor 12 outputs commands to be executed by GPU 14 and data that are operands of the commands (e.g., data on which the commands operate) to system memory 16 and/or directly to GPU 14. GPU 14 receives the commands and data, directly from processor 12 and/or from system memory 16, and executes the commands. In some examples, rather than storing commands to be executed by GPU 14, and the data operands for the commands, in system memory 16, processor 12 may store the commands and data operands in a local memory that is local to the IC that includes GPU 14 and processor 12 and shared by both processor 12 and GPU 14. In general, the techniques described in this disclosure are applicable to the various ways in which processor 12 may make available the commands for execution on GPU 14, and the techniques are not limited to the above examples.

The rate at which GPU 14 executes the commands is set by the frequency of a clock signal (also referred to as a clock rate). For example, GPU 14 may execute a command every rising or falling edge of the clock signal, or execute one command every rising edge and another command every falling edge of the clock signal. Accordingly, how often a rising or falling edge of the clock signal occurs within a time period (e.g., frequency of the clock signal) sets how many commands GPU 14 executes within the time period.

In some examples, such as those where processor 12 stores commands to be executed by GPU 14 in memory (e.g., system memory 16 or a local memory), processor 12 may output memory address information identifying a group of commands that GPU 14 is to execute. The group of commands that GPU 14 is to execute is referred to as submitted commands. In examples where processor 12 directly outputs the commands to GPU 14, the submitted commands includes those commands that processor 12 instructs GPU 14 to execute immediately.

There may be various ways in which processor 12 may group commands. As one example, a group of commands includes all the commands needed by GPU 14 to render one frame. As another example, a group of commands may be so-called "atomic commands" that are to be executed together without GPU 14 switching to other commands. Other ways to group commands that are submitted to GPU 14 may be possible, and the disclosure is not limited to the above example techniques.

In some cases, GPU 14 may need to execute the submitted commands within a set time period. For instance, device 10 may be handheld device, where display 18 also functions as the user interface. As one example, to achieve a stutter free (also referred to as jank-free) user interface, GPU 14 may need to complete execution of the submitted commands within approximately 16 milliseconds (ms) (other time periods are possible). This 16 ms time period may be referred to as a "vsync" window, and if GPU 14 does not complete execution of the submitted commands within the vsync window, there may be "bubbles" in an execution pipeline of GPU 14 causing a jank filled user interface.

The "bubbles" in the execution pipeline of GPU 14 refers to conditions where units of GPU 14 that are executing the commands have partially completed the execution of the commands to produce some intermediate data, but units of GPU 14 that are to receive the intermediate data are still busy executing other commands causing the intermediate data to keep building. For instance, the execution pipeline of GPU 14 includes a series of units that each produce intermediate data that is further processed by the next unit in the series (i.e., in the pipeline). In some cases, upstream units of an execution pipeline of GPU 14 are producing intermediate data faster than downstream units of the execution pipeline of GPU 14 can consume, creating a so-called bubble.

The amount of commands that processor 12 submits need not necessarily be constant. There may be an influx or reduction in the number of commands GPU 14 is to execute. For example, the application executing on processor 12 (e.g., a third-party application) may increase or decrease the number of commands to be executed by GPU 14, or an operating system executing on processor 12 (e.g., the framework itself) may increase or decrease the number of commands to be executed by GPU 14.

Because the amount of commands GPU 14 is to execute within a set time period (e.g., 16 ms) may change, the frequency of the clock signal of GPU 14 (i.e., the clock rate of GPU 14) may need to increase or decrease so that GPU 14 is able to execute the commands within the set time period, without unnecessarily increasing power consumption. For instance, if the frequency of the clock signal were permanently kept at a relatively high frequency, then GPU 14 would be able to timely execute the submitted commands in most instances. However, executing commands at a relatively high frequency causes the power consumption of GPU 14 to increase. If the frequency of the clock signal were permanently kept at a relatively low frequency, then the power consumption of GPU 14 may be reduced, but GPU 14 may not be able to timely execute submitted commands in most instances, leading to janky behavior and possibly other unwanted effects.

The techniques described in this disclosure describe example ways in which to proactively increase or decrease the clock rate (i.e., frequency of the clock signal) of GPU 14 based on a determination of the "workload" with which GPU 14 is about to be tasked. The "workload" of GPU 14 refers to amount of commands in the submitted commands that are to be executed by GPU 14.

For example, because the application executing on processor 12 generates the commands to be executed by GPU 14, the application may be able to determine the amount of commands GPU 14 will be tasked with executing within a set period of time. However, in some cases, the application executing on processor 12 may not be designed to determine the amount of commands GPU 14 will be tasked with executing, or not designed to cause processor 12 to determine a performance level of GPU 14.

In addition to or instead of the application executing on processor 12, the operating system executing on processor 12 may also determine the amount of commands GPU 14 will be tasked with executing. For instance, the operating system may be designed to reserve storage locations for storing the commands to be submitted to GPU 14, and based on the amount of storage locations the operating system reserves, the operating system may determine the amount of commands GPU 14 will be tasked with executing. There may be other ways in which to determine the amount of commands GPU 14 will be tasked with executing, as described in more detail with respect to FIG. 2, and the techniques described in this disclosure are applicable to these other ways as well and techniques in addition to those described above and with respect to FIG. 2.

Processor 12 may output information indicating a performance level based on the amount of commands GPU 14 is to execute (i.e., the amount of commands in the submitted commands). GPU 14 may receive the information indicating the performance level, and in response, GPU 14 may increase or decrease the clock rate. In some examples, GPU 14 may increase or decrease the clock rate prior to the execution of the commands, and possibly prior to the reception of the commands. For instance, GPU 14 may receive information indicating the performance level, where the performance level was determined from commands that GPU 14 has not yet executed or possibly even received. In other words, GPU 14 uses the information indicating the performance level for executing the submitted commands to determine a clock rate (e.g., increase or decrease the clock rate) prior to executing the submitted commands that processor 12 used to determine the performance level.

In some examples, the information indicating the performance level may be based only on the submitted commands. For instance, processor 12 may determine the performance level based on a first set of commands, and no other set of commands. The performance level information may cause GPU 14 to determine and adjust the frequency of the clock signal for timely execution of the first set of commands, prior to executing the commands. Processor 12 may output information indicating the performance level for that first set of submitted commands. Processor 12 may then determine the performance level based on a second set of commands, and no other set of commands. Processor 12 may output information indicating the performance level for the second set of submitted commands (or may not output information if there is no change in the performance level), and so forth. The performance level information may cause GPU 14 to determine and adjust the frequency of the clock signal for timely execution of the second set of commands, prior to executing the commands.

Processor 12 may not output information indicating the performance level for every set of commands to be executed by GPU 14. As indicated above, if there is no change in the expected/future performance level, processor 12 may not output information indicating the performance level. However, even if there is a change in the performance level, processor 12 may not output information indicating the performance level in every instance. In other words, processor 12 may occasionally output information indicating the performance level needed for timely execution of a particular set of commands, but may not output such information for every set of commands. However, in some examples, it may be possible for processor 12 to always output information indicating the performance level needed for timely execution of a particular set of commands. How often processor 12 outputs information indicating the performance level may be a matter of choice.

In this disclosure, processor 12 outputting information indicating the performance level may be considered as processor 12 outputting information indicating the clock rate needed for timely execution of the set of commands. After processor 12 outputs information indicating the expected performance level, processor 12 may instruct GPU 14 to execute one or more commands of the commands.

In this manner, GPU 14 may be able to adjust the clock rate before executing the commands to ensure that commands are executed within the time period. This allows GPU 14 to adjust the clock rate without any latency because the clock rate adjustment is based on information before execution of commands, rather than only information determined after execution of commands.

For instance, in some examples, processor 12 may maintain a history of the amount of commands GPU 14 executed. Based on the history of the amount of commands GPU 14 executed, processor 12 may estimate what the clock rate should be. Conceptually, this can be considered as processor 12 continuously determining what the clock rate should be based on recently executed commands by GPU 14. With such techniques, the clock rate that processor 12 determines is approximately equal to what the clock rate should be. For example, the clock rate, determined from a history of executed commands, indicates what the clock rate should have been a few commands earlier, and there may not be much deviation in the clock rates from where it should have been a few commands earlier and where it should be for the current command.

While relying on executed commands to determine what the clock rate should be, the latency associated with determining the clock rate means that the clock rate may not be sufficiently high to ensure timely execution of the submitted commands. With the techniques described in this disclosure, GPU 14 may adjust the clock rate without any latency (e.g., adjust the clock rate immediately).

In some examples, GPU 14 may be configured to adjust the clock rate (e.g., frequency of the clock signal) based on the information received indicating the performance level for executing commands, which is based on an amount of the commands that GPU 14 is to execute. However, in some examples, GPU 14 may utilize both the received information indicating the performance level and the clock rate determined based on the history of the amount of commands executed by GPU 14 to determine the clock rate.

For example, processor 12 may determine that there will be an influx in the amount of commands that GPU 14 is to execute, and in response instruct GPU 14 to increase its performance level. As GPU 14 is executing commands, processor 12 may monitor the usage of the GPU 14 (e.g., percentage of cores of GPU 14 that are utilized to execute the commands). From the monitored usage of GPU 14, which is based on a history of the amount of commands executed by GPU 14, processor 12 may determine a clock rate for GPU 14. Processor 12 may determine a clock rate for GPU 14 based on the clock rate processor 12 determined prior to GPU 14 executing the commands and the clock rate based on the usage of GPU 14 during the execution of the commands.

It should be understood that the usage of GPU 14 during execution of the commands is one example way in which processor 12 uses the history of the amounts of commands executed by GPU 14 for clock rate determination. In general, processor 12 may utilize the workload history of GPU 14 (e.g., amount of commands executed by GPU 14) and statistics, such as variance and/or trend values of the commands and the usage of GPU 14, collected and calculated during the runtime of the commands.

In this way, GPU 14 may be able to immediately increase the frequency to a higher value before executing the commands. Then, GPU 14 executes one or more commands at the higher clock rate ensuring that the commands are executed within the set time period (e.g., the 16 ms of the vsync window). As GPU 14 is executing the commands, processor 12 may determine what the minimum clock rate would have been needed to be to execute the recently executed commands within the set time period. Processor 12 may determine a new clock rate for GPU 14 based on the determined clock rate prior to the execution of the set of commands and the determined clock rate subsequent to the execution of one or more commands of the set of commands.

For instance, processor 12 may utilize a weighted average, where processor 12 initially weighs the determined clock rate prior to execution of commands more heavily than the determined clock rate subsequent to execution of one or more commands of the set of commands. Then, as GPU 14 completes execution of some of the commands from the set of commands, processor 12 may determine the clock rate based on a history of the executed commands (e.g., statistical models such as GPU 14 usage, variance in number of executed commands, trend data, etc.). Processor 12 may weigh the determine clock rate prior to execution of commands less heavily than the determined clock rate after execution of one or more commands of the set of commands.

In this way, GPU 14 may receive information indicating a performance level to execute a set of commands. The performance level is based on an amount of commands in the set of commands that GPU 14 is to execute within a set of time period. GPU 14 may determine a clock rate based on the received information prior to execution the commands of the set of commands. In some examples, GPU 14 may determine a clock rate based on the received information prior to units of GPU 14 even receiving the commands of the set of commands. GPU 14 may then execute one or more commands of the set of commands at the determined clock rate.

During the execution of the one or more commands of the set of commands, processor 12 may determine a clock rate based on a prior history of an amount of commands that GPU 14 executed (e.g., based on a statistical model of the actual workload of GPU 14). Processor 12 may determine a clock rate based on the clock rate determined from the information indicating the performance level and the clock rate determined from the history of prior executed commands. GPU 14 may execute one or more commands subsequent to the one or more executed commands at this newly determined clock rate. Processor 12 may continuously determine new clock rate in this manner.

For example, processor 12 may output information indicating the performance level of GPU 14 to GPU 14, where this performance level is based on the amount of commands in a set of commands GPU 14 is to execute. Then, as GPU 14 is executing one or more commands in the set of commands, processor 12 may determine an update in the performance level of GPU 14. Processor 12 may continuously determine an update in the performance level of GPU 14, and output the updated performance level to GPU 14.

Processor 12 may weigh the clock rate determined from the received information and the clock rate determined from history of prior executed commands differently. For instance, initially, processor 12 may weigh the clock rate determined from the received information more heavily, and then overtime (e.g., as more commands are executed), processor 12 may progressively increase a weighting of the clock rate determined from the history of prior executed commands during the execution of commands of the set of commands. In other words, it may be desirable for GPU 14 to initially start at a clock rate based on the performance level, but then as GPU 14 executes commands, the clock rate determined from the history of prior executed commands may provide a better measure of what the clock rate needs to be. Therefore, processor 12 may progressively increase the weighting of the second clock rate during the executing of the commands.

In some examples, processor 12 may provide the information indicating of the performance level of GPU 14. For instance, processor 12 may determine an amount of commands in a set of commands that GPU 14 needs to execute within a set period of time. Processor 12 may determine a performance level of GPU 14 based on the determined amount of commands in the set of commands that GPU 14 needs to execute within the set period of time. Processor 12 may output the information indicating the performance level of GPU 14.

Figure 2:
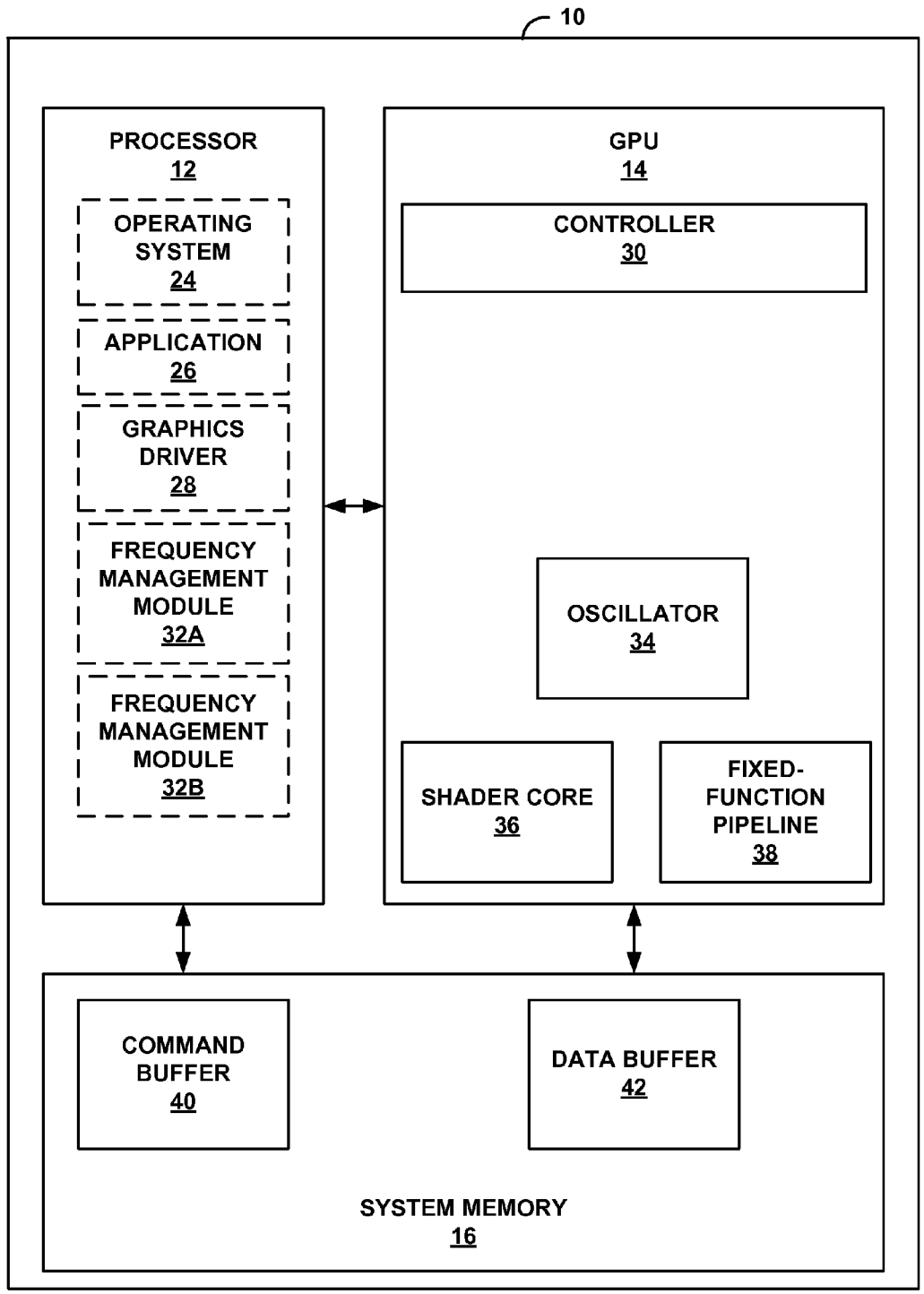
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes controller 30, oscillator 34, shader core 36, and fixed-function pipeline 38. Shader core 36 and fixed-function pipeline 38 may together form an execution pipeline used to perform graphics or non-graphics related functions. Although only one shader core 36 is illustrated, in some examples, GPU 14 may include one or more shader cores similar to shader core 36.

The commands that GPU 14 is to execute are executed by shader core 36 and fixed-function pipeline 38, as determined by controller 30 of GPU 14. Controller 30 may be implemented as hardware on GPU 14 or software or firmware executing on hardware of GPU 14.

Controller 30 may receive commands that are to be executed from command buffer 40 of system memory 16 or directly from processor 12 (e.g., receive the submitted commands that processor 12 determined should now be executed by GPU 14). Controller 30 may also retrieve the operand data for the commands from data buffer 42 of system memory 16 or directly from processor 12. Controller 30 may determine which commands are to be executed by shader core 36 (e.g., software instructions are executed on shader core 36) and which commands are to be executed by fixed-function pipeline 38 (e.g., commands for units of fixed-function pipeline 38).

In some examples, commands and/or data from one or both of command buffer 40 and data buffer 42 may be part of a local memory of GPU 14. For instance, GPU 14 may include an instruction cache and a data cache that stores commands from command buffer 40 and data from data buffer 42, respectively. In these examples, controller 30 may retrieve the commands and/or data from the local cache.

Shader core 36 and fixed-function pipeline 38 may transmit and receive data from one another. For instance, some of the commands that shader core 36 executes may produce intermediate data that are operands for the commands that units of fixed-function pipeline 38 are to execute. Similarly, some of the commands that units of fixed-function pipeline 38 execute may produce intermediate data that are operands for the commands that shader core 36 is to execute. In this way, the received data is progressively processed through units of fixed-function pipeline 38 and shader core 36 in a pipelined fashion. Hence, shader core 36 and fixed-function pipeline 38 may be referred to as implementing an execution pipeline.

In general, shader core 36 allows for various types of commands to be executed, meaning that shader core 36 is programmable and provides users with functional flexibility because a user can program shader core 36 to perform desired tasks in most conceivable manners. The fixed-function units of fixed-function pipeline 38, however, are hardwired for the manner in which the fixed-function units perform tasks. Accordingly, the fixed-function units may not provide much functional flexibility.

As also illustrated in FIG. 2, GPU 14 includes oscillator 34. Oscillator 34 outputs a clock signal that sets the time instances when shader core 36 and/or units of fixed-function pipeline 38 execute commands. Although oscillator 34 is illustrated as being internal to GPU 14, in some examples, oscillator 34 may be external to GPU 14. Also, oscillator 34 need not necessarily just provide the clock signal for GPU 14, and may provide the clock signal for other components as well.

Oscillator 34 may generate a square wave, a sine wave, a triangular wave, or other types of periodic waves. Oscillator 34 may include an amplifier to amplify the voltage of the generated wave, and output the resulting wave as the clock signal for GPU 14.

In some examples, on a rising edge or falling edge of the clock signal outputted by oscillator 34, shader core 36 and each unit of fixed-function pipeline 38 may execute one command. In some cases, a command may be divided into sub-commands, and shader core 36 and each unit of fixed-function pipeline 38 may execute a sub-command in response to a rising or falling edge of the clock signal. For instance, the command of A+B includes the sub-commands to retrieve the value of A and the value of B, and shader core 36 or fixed-function pipeline 38 may execute each of these sub-commands at a rising edge or falling edge of the clock signal.

The rate at which shader core 36 and units of fixed-function pipeline 38 execute commands may affect the power consumption of GPU 14. For example, if the frequency of the clock signal outputted by oscillator 34 is relatively high, shader core 36 and the units of fixed-function pipeline 38 may execute more commands within a time period as compared the number of commands shader core 36 and the units of fixed-function pipeline 38 would execute for a relatively low frequency of the clock signal. However, the power consumption of GPU 14 may be greater in instances where shader core 36 and the units of fixed-function pipeline 38 are executing more commands in the period of time (due to the higher frequency of the clock signal from oscillator 34) than compared to instances where shader core 36 and the units of fixed-function pipeline 38 are executing fewer commands in the period of time (due to the lower frequency of the clock signal from oscillator 34).

As described above, processor 12 may offload tasks to GPU 14 due to the massive parallel processing capabilities of GPU 14. For instance, GPU 14 may be designed with a single instruction, multiple data (SIMD) structure. In the SIMD structure, shader core 36 includes a plurality of SIMD processing elements, where each SIMD processing element executes same commands, but on different data.

A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 14 to perform many tasks in parallel (e.g., at the same time). For such SIMD structured GPU 14, each SIMD processing element may execute one thread on a rising edge or falling edge of the clock signal.

To avoid confusion, this disclosure uses the term "command" to generically refer to a process that is executed by shader core 36 or units of fixed-function pipeline 38. For instance, a command includes an actual command, constituent sub-commands (e.g., memory call commands), a thread, or other ways in which GPU 14 performs a particular function. Because GPU 14 includes shader core 36 and fixed-function pipeline 38, GPU 14 may be considered as executing the commands.

Also, in the above examples, shader core 36 or units of fixed-function pipeline 38 execute a command in response to a rising or falling edge of the clock signal outputted by oscillator 34. However, in some examples, shader core 36 or units of fixed-function pipeline 38 may execute one command on a rising edge and another, subsequent command on a falling edge of the clock signal. There may be other ways in which to "clock" the commands, and the techniques described in this disclosure are not limited to the above examples.

Because GPU 14 executes commands every rising edge, falling edge, or both, the frequency of clock signal (also referred to as clock rate) outputted by oscillator 34 sets the amount of commands GPU 14 can execute within a certain time. For instance, if GPU 14 executes one command per rising edge of the clock signal, and the frequency of the clock signal is 1 MHz, then GPU 14 can execute one million commands in one second.

As described above, in some cases, GPU 14 may execute submitted commands (e.g., the set of commands that GPU 14 retrieves from command buffer 40) within a set time period. However, the amount of commands in the submitted commands may be variable (i.e., the number of commands that GPU 14 needs to execute within the time period need not be constant for every set of submitted commands).

For instance, as illustrated in FIG. 2, processor 12 executes application 26, as illustrated by the dashed boxes. During execution, application 26 generates commands that are to be executed GPU 14, including commands that instruct GPU 14 to retrieve and execute shader programs (e.g., vertex shaders, fragment shaders, compute shaders for non-graphics applications, and the like). In addition, application 26 generates the data on which the commands operate (i.e., the operands for the commands). Processor 12 stores the generated commands in command buffer 40, and stores the operand data in data buffer 42.

After processor 12 stores the generated commands in command buffer 40, processor 12 makes available the commands for execution by GPU 14. For instance, processor 12 communicates to GPU 14 the memory addresses of a set of the stored commands and their operand data, where GPU 14 is to execute the set of commands, and information indicating when GPU 14 is to execute the set of commands. In this way, processor 12 submits commands to GPU 14 for execution.

As illustrated in FIG. 2, processor 12 may also execute graphics driver 28. In some examples, graphics driver 28 may be software or firmware executing on hardware or hardware units of processor 12. Graphics driver 28 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 28. For example, when processor 12 outputs information indicating the amount of commands GPU 14 is to execute, graphics driver 28 may be the unit of processor 12 that outputs the information to GPU 14.

As additional examples, application 26 produces graphics data and graphics commands, and processor 12 may offload the processing of this graphics data to GPU 14. In this example, processor 12 may store the graphics data in data buffer 42 and the graphics commands in command buffer 40, and graphics driver 28 may instruct GPU 14 when to retrieve the graphics data and graphics commands from data buffer 42 and command buffer 40, respectively, from where to retrieve the graphics data and graphics commands from data buffer 42 and command buffer 40, respectively, and when to process the graphics data by executing one or more commands of the set of commands.

Also, application 26 may require GPU 14 to execute one or more shader programs. For instance, application 26 may require shader core 36 to execute a vertex shader and a fragment shader to generate images that are to be displayed (e.g., on display 18 of FIG. 1). Graphics driver 28 may instruct GPU 14 when to execute the shader programs and instruct GPU 14 with where to retrieve the graphics data from data buffer 42 and where to retrieve the commands from command buffer 40 or from other locations in system memory 16. In this way, graphics driver 28 may form a link between processor 12 and GPU 14.

Graphics driver 28 may be configured in accordance to an application processing interface (API); although graphics driver 28 does not need to be limited to being configured in accordance with a particular API. In an example where device 10 is a mobile device, graphics driver 28 may be configured in accordance with the OpenGL ES API. The OpenGL ES API is specifically designed for mobile devices. In an example where device 10 is a non-mobile device, graphics driver 28 may be configured in accordance with the OpenGL API.

In the example techniques described in this disclosure, there may be various ways in which processor 12 may determine the amount of commands that GPU 14 is to execute within the time period. For example, the amount of commands in the submitted commands may be based on the commands needed to render one frame of the user-interface or gaming application. For the user-interface example, GPU 14 may need to execute the commands needed to render one frame of the user-interface within the vsync window (e.g., 16 ms) to provide a jank-free user experience. If there is a relatively large amount of content that needs to be displayed, then the amount of commands may be greater than if there is a relatively small amount of content that needs to be displayed.

To ensure that GPU 14 is able to execute the submitted commands within the set time period, controller 30 may adjust the frequency (i.e., clock rate) of the clock signal that oscillator 34 outputs. However, to adjust the clock rate of the clock signal such that the clock rate is high enough to allow GPU 14 to execute the submitted commands within the set time period, controller 30 may receive information indicating the performance level needed to execute the set of commands (e.g., submitted commands) within the time period, and determine the clock rate based on the received information.

For instance, if controller 30 receives information indicating what the performance level is needed based on how many commands GPU 14 is to execute within the time period, either as an absolute value or a relative value, prior to GPU 14 executing the commands, controller 30 may determine whether to increase or decrease the frequency of the clock signal. Controller 30 may increase the clock rate if controller 30 determines that a higher performance level (e.g., higher clock rate) is needed to execute the commands within the time period than the current clock rate for timely execution. To reduce power consumption, controller 30 may decrease the clock rate if controller 30 determines that as high as a performance level is not needed to execute the commands within the time period (i.e., a lower clock rate is sufficient to timely execute the commands).

In the techniques described in this disclosure, controller 30 may determine the performance level based on information received from processor 12 that indicates the performance level. The performance level is based on an amount of commands GPU 14 is to execute within a time period. Controller 30 may then increase or decrease the frequency of the clock signal outputted by oscillator 34 based on the determination of the performance level. In this manner, the frequency of the clock signal may increase before GPU 14 is to execute the commands that were used to determine the performance level of GPU 14.

Because application 26 generates the commands that GPU 14 is to execute, application 26 may determine the amount of commands GPU 14 is to execute within a set time period, and may, therefore, be able to determine the performance level of GPU 14. Processor 12 may then output information indicating the performance level of GPU 14, where the performance level is based on an amount of commands GPU 14 is to execute within the set time period.

However, in some cases, while application 26 may generate the commands and the operand data, application 26 may not have been designed to determine the performance level of GPU 14. In some examples, if application 26 does not determine the performance level of GPU 14 or does not cause processor 12 to output information indicating the performance level, GPU 14 may still be able to receive information indicating the performance level needed to timely execute the commands that were used to determine the performance level. As illustrated in FIG. 2, processor 12 also executes operating system 24. Operating system 24 is configured to manage resources of processor 12, such as allocate memory resources and handle the transfer of commands and data to and from memory, such as the memory that includes command buffer 40 or data buffer 42 (system memory 16 in the example illustrated in FIG. 2).

Therefore, operating system 24 may be configured to determine the amount of commands GPU 14 is to execute because operating system 24 determines the memory resources needed to store the commands and operand data in command buffer 40 and data buffer 42. Moreover, when processor 12 submits the commands, it is operating system 24 that determines the memory addresses for where GPU 14 is to retrieve commands from command buffer 40 and operands data from data buffer 42. Accordingly, operating system 24 may determine the amount of commands GPU 14 is to execute within a time period. Operating system 24 may determine the performance level of GPU 14 based on the determined amount of commands GPU 14 is to execute within a time period, and cause processor 12 to output the information indicating the performance level.

There may be other ways in which processor 12 may utilize application 26 and/or operating system 24 to proactively determine the performance level of GPU 14 before GPU 14 executes commands that were used to determine the performance level of GPU 14. The following provides two additional examples for how processor 12 may utilize information from application 26 and/or operating system 24 to determine the performance level of GPU 14.

As a first example for how processor 12 proactively determines the expected performance level of GPU 14, assume that application 26 is a video game such as, but not required to be, one that produces high definition graphics, and device 10 is a mobile device. In this example, if a video player is displaying the output of application 26 when device 10 is in the portrait orientation, application 26 may need to submit commands to GPU 14 to render only a small area of display 18. However, when a user rotates device 10 to the landscape orientation for a transitory period of a few frame, GPU 14, at the current clock rate, may not be able to produce a frame within 16 ms.

In this example, operating system 24 may notify application 26 about a change in the orientation, and processor 12, in turn, may determine the performance level of GPU 14. For instance, as illustrated in FIG. 2, processor 12 may execute frequency management module 32A; however, frequency management module 32A may be hardware of processor 12 or a combination of hardware and software or firmware. Frequency management module 32A may determine that application 26 will be increasing the amounts of commands GPU 14 is to execute, and in turn may determine a performance level needed by GPU 14 before GPU 14 executes the commands, and may be even before GPU 14 receives the commands.

Frequency management module 32A may then indicate to graphics driver 28 that a performance level of GPU 14 is to increase. Graphics driver 28 may then output information indicating the expected performance level of GPU 14, and controller 30 of GPU 14 may in turn increase the frequency of oscillator 34.

In the case where the user changes device 10 from the landscape orientation to the portrait orientation, there is a decrease in the area to be displayed on display 18. For such a scenario, operating system 24 may notify application 26 of the change to portrait orientation, and frequency management module 32A may determine that there will be reduction in the amount of instructions to be executed, and determine the expected performance level of GPU 14. Graphics driver 28 may output information indicating the expected performance level of GPU 14.

In some examples, frequency management module 32A may determine the amount of increase (or decrease) in the amount of commands based on information provided by application 26 or based on information determined by operating system 24 (e.g., based on allocated memory). Based on the received information, frequency management module 32A may determine the performance level of GPU 14. In this manner, processor 12 may determine the performance level of GPU 14.

As a second example for how processor 12 proactively determines the expected performance level of GPU 14, the final screen displayed by display 18 may be a composition of all applications executing on device 10 that produce graphical data (e.g., in addition to application 26, applications that produce the current time in examples where device 10 is a mobile device). Operating system 24 may choose to use GPU 14 to composite the various graphics outputs for display on display 18.

However, in a case where there is only one application running, operating system 24 may bypass the composition stage, performed by GPU 14, and directly display the graphics output on display 18. In such a case (e.g., the bypass of the composition stage), controller 30 may turn off oscillator 34 to conserve power.

In this mode, processor 12 may need to execute another application. For instance, assume that application 26 is an application that when executed provides a pop up notification of an incoming call. In the mode where oscillator 34 is off because operating system 24 bypassed the composition stage, when there is an incoming call, operating system 24 may cause application 26 to execute. Also, operating system 24 may no longer bypass the composition that GPU 14 performs, and instead utilize GPU 14 to composite all the graphics data produced by the different applications (e.g., the application that outputs the time and application 26 that outputs the pop up notification of the incoming call).

When GPU 14 needs to quickly perform the composition, operating system 24 may determine that there is a sudden increase in the amount of commands GPU 14 is to execute, and may indicate to frequency management module 32A of the increase in the commands. Frequency management module 32A may determine the performance level, and instruct graphics driver 28 to output information indicating the performance level to GPU 14. In this way, rather than setting the frequency of oscillator 34 to some default level (which may cause janky behavior if too low or cause unnecessary power consumption if too high), processor 12 may determine the expected performance level of GPU 14 before GPU 14 is to execute the commands, and controller 30 of GPU 14 can set the frequency of oscillator 34 to ensure timely execution of the commands. This allows processor 12 to determine a specific performance level so that oscillator 34 jumps to the more precise clock rate, as compared to a default clock rate.

The performance level that processor 12 outputs may be an absolute value or a relative value. For example, processor 12 may output an instruction that indicates whether higher or lower performance, relative to the current performance is needed. In this example, controller 30 increases or decreases the frequency of oscillator 34 by a determined value, where the determined value may be a fixed value (e.g., increase or decrease by 5%) or a value that is determined from various factors such as current load, overall power consumption, etc. In some examples, processor 12 may output an instruction that indicates maximum or minimum performance. In these examples, controller 30 may adjust the frequency of oscillator 34 to a highest frequency for maximum performance, or the lowest frequency for minimum performance.

In some examples, processor 12 may output a performance level value between a maximum value and a minimum value. GPU 14 may store a lookup table that maps the performance level value to a particular frequency of oscillator 34, and controller 30 may increase or decrease the frequency of oscillator 34 based on the lookup table.

Furthermore, in some examples, processor 12 may output a value indicating the clock rate. The value indicating the clock rate is another example of information indicating a performance level. In such examples, controller 30 may not need a lookup table to determine the frequency of oscillator 34, and may instead set the frequency of oscillator 34 based on the value indicating the clock rate received from processor 12.

Although possible, processor 12 may not need to output information indicating the performance level for every set of commands that GPU 14 is to execute. Also, although possible, processor 12 may not need to determine the performance level for every set of commands that GPU 14 is to execute. In instances where processor 12 does output information indicating the performance level, controller 30 may increase or decrease the frequency of oscillator 34 accordingly.

As illustrated in FIG. 2, processor 12 also includes frequency management module 32B. In some examples, similar to frequency management module 32A, frequency management module 32B may be software or firmware executing on processor 12, and is therefore illustrated in dashed boxes. However, also like frequency management module 32A, frequency management module 32B may be hardware components or a combination of hardware and software. Also, frequency management module 32A and 32B are illustrated as separate modules to ease with understanding, but may be readily combined into a single module of processor 12.

Frequency management module 32B may be configured to determine the clock rate based on recently executed commands. Frequency management module 32B may not be necessary in every example. In some examples, the techniques implemented by frequency management module 32B may be dynamic voltage and clock scaling (DVCS) or dynamic clock and voltage scaling (DCVS) control that provide control based on running average, variant, and/or trend. One example way in which frequency management module 32B may be implemented is described in U.S. Pat. No. 8,650,423.

In general, frequency management module 32B may maintain a running statistics of the workload of GPU 14. For instance, frequency management module 32B may maintain one or more of a running average busy and/or idle duration, an idle/busy ratio, a variance of the running average, and a trend of the running average of the workload. Based on the statistics of the workload of GPU 14, frequency management module 32B may continuously determine the frequency of the clock signal outputted by oscillator 34.

However, there may be some latency in frequency management module 32B determining the frequency of the clock signal. For instance, frequency management module 32B utilizes the recently executed commands to determine what the clock rate should have been for the recently executed commands. But, by the time frequency management module 32B determines the clock rate, GPU 14 has already started to execute the next commands. Also, for low end examples of GPUs, the latency may be relatively high. Accordingly, the clock rate determination from frequency management module 32B may be slightly delayed from what the clock rate should actually be.

In some examples, processor 12 may utilize the outputs from both frequency management module 32A and frequency management module 32B to adjust the frequency of the clock signal outputted by oscillator 34. For instance, based on information received from frequency management module 32A of the performance level of GPU 14, controller 30 may determine and set the clock rate of oscillator 34 to the determined clock rate before GPU 14 starts to execute the commands that were used to determine the performance level of GPU 14. Then, while GPU 14 executes the commands, frequency management module 32B may continuously determine the clock rate of oscillator 34.

Processor 12 may determine the final clock rate of oscillator 34 based on the clock rate determined by frequency management module 32A and the clock rate determined by frequency management module 32B. For instance, processor 12 may determine a weighted average of the clock rates to determine the final clock rate of oscillator 34. As one example, processor 12 may initially more heavily weigh the clock rate determined by frequency management module 32A than the clock rate determined by frequency management module 32B so that the effect of the clock rate determined by frequency management module 32A is greater on the final clock rate than the clock rate determined by frequency management module 32B. Then, over time, processor 12 may decrease the weighting of the clock rate determined by frequency management module 32A and increase the weighting the clock rate determined by frequency management module 32B because the clock rate determined by frequency management module 32B is based on the actual commands executed by GPU 14. There may other criteria that processor 12 uses to determine the weighting, and the techniques are not limited to above provided examples.

In this manner, the techniques described in this disclosure allow for application 26 or operating system 24 to control the clock rate of GPU 14. For instance, generally processor 12, application 26, or operating system 24 cannot determine the frequency of the clock signal of GPU 14 (e.g., as they normally do not have visibility into the frequency scaling process). However, there may be benefits to allow processor 12, application 26, and/or operating system 24 to assist in setting the clock rate of GPU 14. With the techniques described in this disclosure, application 26 and/or operating system 24, via graphics driver 28 of processor 12, may output "hints" or "meta-data," such as instructions, that indicate the performance level of GPU 14 that GPU 14 can use to set the clock rate of oscillator 34.

Furthermore, by utilizing a hybrid scheme, in which processor 12 determines the clock rate of oscillator 34 (i.e., the frequency of the clock signal outputted by oscillator 34) based on frequency management module 32A and frequency management module 34B, processor 12 may be able to more accurately adjust the clock rate of oscillator 34, while ensuring that commands are executed in the allotted time period. For example, in response to receiving information indicating an increase in performance level, controller 30 may immediately increase the clock rate of oscillator 34, at the cost of increased power consumption, before frequency management module 34B can implement its decision process of the clock rate. In this way, during the time window that frequency management module 34B is determining the clock rate, GPU 14 is executing the submitted commands at the higher frequency, ensuring that the commands are executed within the set time period (e.g., the 16 ms vsync window).

Then, frequency management module 32B may determine the clock rate based on the recently executed commands (e.g., history of the workload frequency management module 34B just witnessed). Processor 12 may implement some technique (e.g., weighted average) to determine the actual clock rate based on the determined clock rates from frequency management module 32A and 32B. Because frequency management module 32A and 32B together are used to determine the clock rate, the techniques described in this disclosure may be considered as "user assisted DCVS," where the user refers to application 26 or operating system 24 providing the information indicating the performance level, and DCVS refers to the functionality of frequency management module 32B.

In the opposite scenario, application 26 and/or operating system 24 may determine that there is an upcoming "idle" state or minimal usage stage. In this example, application 26 and/or operating system 24, via graphics driver 28, may indicate a reduction in the performance level. In response, controller 30 may reduce the clock rate of oscillator 34. In this scenario, there may not be jank in the user-interface due to the low clock rate because there may not be as many commands to execute in the time period, but there may be a decrease in power consumption if GPU 14 is not executing commands at a higher rate.

The power saving per instance of clock rate reduction may not be very much. However, over a long time interval, with repeated reduction in clock rate when possible, the power reduction may be an appreciable value.

The above described that processor 12 outputs information indicating the performance level. The following describes some example ways in which processor 12 may perform such functions.

Processor 12, via application 26 and/or operating system 24, may determine the performance level of GPU 14. Application 26 and/or operating system 24 may instruct graphics driver 28 to implement a function call to output information indicating the performance level of GPU 14. For example, for processor 12 to output the information indicating the performance level, graphics driver 28 may implement a function call that generates the instructions in a way that GPU 14 can process. Again, graphics driver 28 may be configured in accordance with the same API for which GPU 14 is configured. Processor 12, via graphics driver 28, may output the instruction indicating the performance level in response to implementing the function call.

An example of the function call may be a function call that receives the performance level of an upcoming frame as an input, and graphics driver 28 outputs the information indicating the performance level. If controller 30 confirms that the frequency of oscillator 34 is set based on the information of the performance level, graphics driver 28 may determine that the function call was successful.

In this way, there may not need to be any changes with the kernel code or other low level modules of application 26 and/or operating system 24. In this manner, any application, along with functionality of frequency management module 32B, may influence the clock rate of GPU 14. For instance, there is no need to change the code of application 26 and/or operating system 24 to include functionality that allows application 26 and/or operating system 24 to determine the clock rate of GPU 14. Rather, in some examples, frequency management modules 32A and 32B may be configured to determine the clock rate, and application 26 and/or operating system 24 may be able to control the clock rate by making a call to frequency management modules 32A and 32B to affect a change in the clock rate.

Graphics driver 28 may output various instructions to indicate the performance level. As one example, graphics driver 28 may output an instruction that indicates a default performance, a low performance, a medium performance, a high performance, a minimum performance, a maximum performance, or relative performance levels such as a higher or faster performance level or a lower or slower performance level.

Additionally, in some examples, graphics driver 28 may output an instruction that indicates that the instruction used to set the performance level applies to all subsequent commands until another instruction follows indicating otherwise. In some examples, graphics driver 28 may output an instruction indicating that the set performance level applies only to that set of commands. In such examples, if graphics driver 28 does not output an instruction indicating the performance level after GPU 14 completes the execution of the commands, controller 30 may set the clock rate to a default clock rate.

In this way, device 10 is a device for processing data comprising processor 12 and GPU 14. Processor 12 may determine an amount of commands in a set of commands that GPU 14 needs to execute within a set period of time (e.g., within 16 ms). For example, operating system 24 or application 26 may determine the amount of commands in the set of commands that GPU 14 will need to execute in the future within the set period of time.

Processor 12 may determine a clock rate for GPU 14, prior to GPU 14 executing commands in the set of commands, based on the amount of commands in the set of commands. In some examples, the clock rate that processor 12 determines may be a relative clock rate or a specific clock rate. As an example of the relative clock rate, processor 12 may determine that GPU 14 is to increase its clock rate or decrease its clock rate. As an example of the specific clock rate, processor 12 may determine that GPU 14 needs to perform at the maximum level, high level, mid-level, low level, or minimum level, where each of these levels corresponds to a clock rate of GPU 14. As another example of the specific clock rate, processor 12 may determine a clock rate value of the clock rate of GPU 14 (e.g., 100 MHz, 200 MHz, etc.). In general, the clock rate of GPU 14 that processor 12 determines may be considered as a performance level of GPU 14.

Processor 12 may output information indicating the clock rate to GPU 14. For instance, graphics driver 28 may implement a function call to output the information indicating the clock rate to GPU 14. The information that processor 12 outputs indicating the clock rate may be relative clock rate or specific clock rate. For example, processor 12 may output information indicating an increase or decrease in the clock rate (e.g., a relative clock rate). As an example, processor 12 may output information indicating a clock rate level (e.g., maximum level, high level, mid-level, low level, or minimum level), or output information indicating the value of the clock rate (e.g., information indicating 250 MHz).

GPU 14 receives the information indicating the clock rate. For example, controller 30 may receive the information indicating the clock rate. Controller 30 may determine the clock rate from the received information. For example, if processor 12 outputted information indicating an increase or decrease in the clock rate, controller 30 may determine the resulting clock rate from the increase or decrease. If processor 12 outputted information indicating a clock rate level (e.g., maximum, high, mid, low, or minimum), controller 30 may determine the clock rate to which the clock rate level corresponds. If processor 12 outputted information indicating the clock rate value (e.g., 100 MHz), controller 30 may determine from the information that the clock rate should be 100 MHz. As described above, the information that processor 12 outputs indicating the clock rate may be considered as a performance level of GPU 14. Accordingly, GPU 14 may determine the clock rate from the received information indicating the performance level, and determine the clock rate prior to executing one or more commands in the set of commands.

Controller 30 may set the clock rate of oscillator 34 based on the determined clock rate, and GPU 14 may execute one or more commands of the set of commands at the determined clock rate. For example, shader core 36 and/or units of fixed-function pipeline 38 may execute one or more commands of the set of commands at the clock rate outputted by oscillator 34.

Furthermore, during execution of the one or more commands of the set of commands, processor 12 may determine another clock rate based on a history of prior executed commands by GPU 14. This other clock rate may be considered as an update to the performance level.

Processor 12 may determine a new clock rate based on the two determined clock rates. For example, processor 12 may apply a weighted average, where the clock rate determined from the history of prior executed commands is progressively weighted more heavily in the average than the clock rate determined based on the amount of commands GPU 14 was to execute. Processor 12 may output information indicating this new clock rate (e.g., information indicating the updated performance level). GPU 14 may determine the clock rate from the received information (e.g., information indicating the updated performance level), and may execute one or more commands, subsequent to those already executed, at the clock rate determined from the updated performance level.

Figure 3:
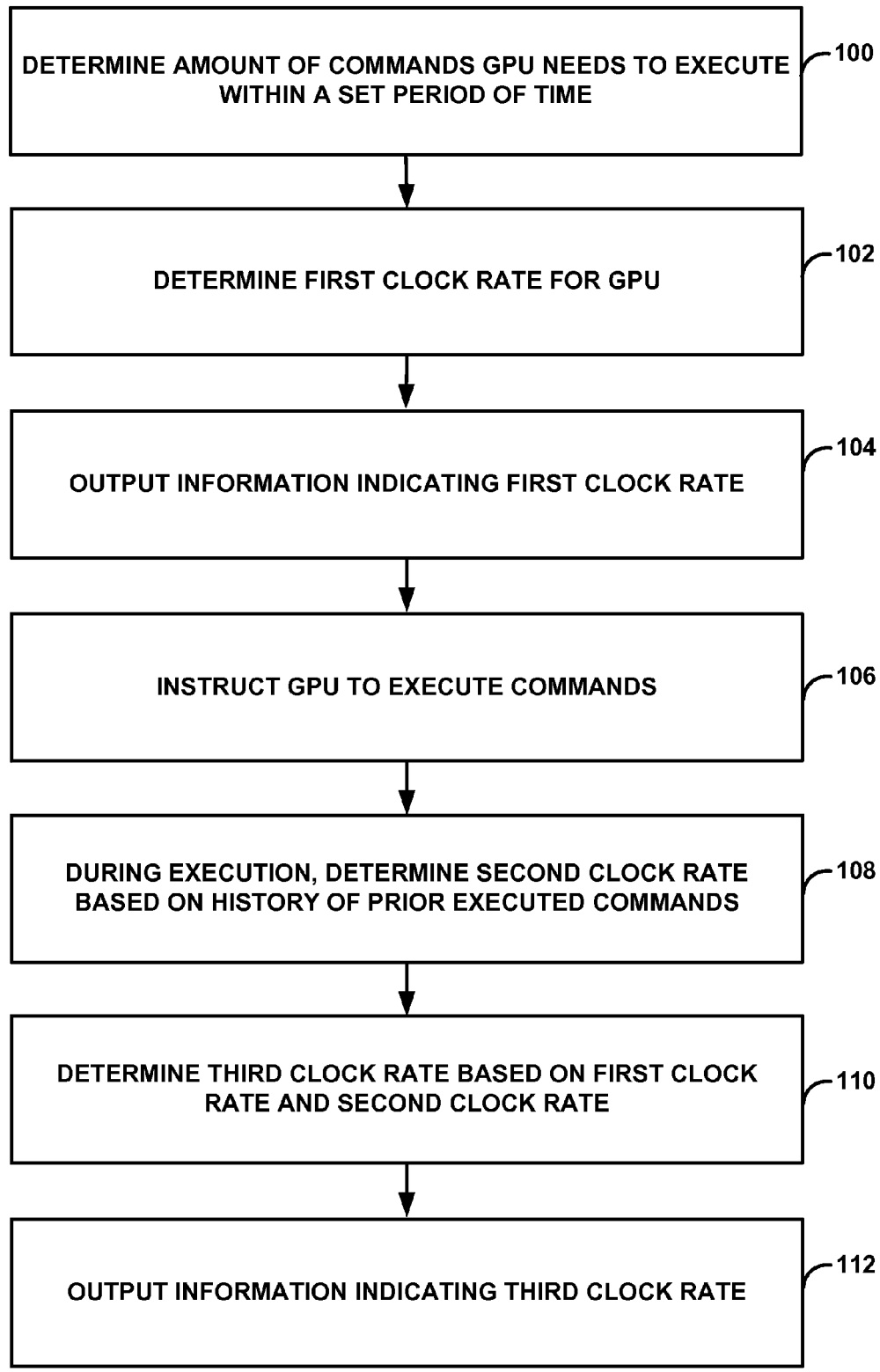
FIG. 3 is a flowchart illustrating an example operation of clock rate determination according to techniques described in this disclosure.

FIG. 3 is a flowchart illustrating an example operation of clock rate determination according to techniques described in this disclosure. As illustrated in FIG. 3, processor 12 may determine an amount of commands in a set of commands that GPU 14 needs to execute within a set period of time (200). For instance, processor 12 may determine an increase in the amount of commands or determine a decrease in the number of commands. One of application 26 executing on processor 12 that generates the commands or operating system 24 executing on processor 12 may determine the amount of commands GPU 14 is to execute within a set period of time.

As an example, processor 12 may determine that GPU 14 is to execute a set of commands that include a group one of commands, a group two of commands, a group three of commands, and a group four of commands. Each of these group of commands may be associated with a tag that expires at the completion of execution of the group. Processor 12 may determine the number of commands in the set of commands that need to be executed.

Processor 12 may determine a first clock rate for GPU 14, prior to GPU 14 executing the commands, based on the amount of commands in the set of commands (102). For example, processor 12 may determine an increase in the clock rate at which GPU 14 needs to execute the commands in the set of commands based on determining the increase in the amount of commands, or processor 12 may determine a decrease in the clock rate at which GPU 14 needs to execute the commands in the set of commands based on determining the decrease in the amount of commands. In some examples, processor 12 may determine the clock rate for GPU 14 prior to at least one of shader core 36 of GPU 14 or units of fixed-function pipeline 38 of GPU receiving the one or more commands of the set of commands.

This first clock rate may be an expected performance level of GPU 14 that is needed to execute the commands within the set period of time. For instance, this first clock rate may be a relative value such as "higher performance," a fixed value such as "maximum performance," or a numerical value such as "200 MHz." This first clock rate may be one example of the expected performance level of GPU 14 described above.

For example, processor 12 may determine an increase in commands that GPU 14 needs to execute in the set time period relative to the current amount of commands that GPU 14 needed to execute in the set time period. In response, processor 12 may determine an increase in a clock rate (e.g., increase in performance level) of GPU 14. Conversely, processor 12 may determine a decrease in commands that GPU 14 needs to execute in the set time period relative to the current amount of commands that GPU 14 needed to execute in the set time period. In response, processor 12 may determine a decrease in a clock rate (e.g., decrease in performance level) of GPU 14.

Processor 12 may output information indicating the first clock rate of GPU 14 (104). For example, application 26 or operating system 24 may cause graphics driver 28 to implement a function call. In response to implementing the function call, graphics driver 28 may output one or more instructions indicating an expected performance level. GPU 14, in turn, may then adjust the frequency of oscillator 34 based on the information indicating the expected performance level so that GPU 14 can execute the commands within the set time period.

Processor 12 may instruct GPU 14 to execute one or more commands of the set of commands (106). For example, processor 12 may submit or otherwise make available the instructions for execution, and GPU 14 may execute the one or more commands at the clock rate set by the indicated performance level. As another example, even if the one or more commands were submitted earlier, processor 12, via graphics driver 28, may instruct GPU 14 to execute the one or more commands (e.g., retrieve the instructions from memory and execute).

During execution of the one or more commands of the set of commands, processor 12 may determine a second clock rate based on a history of prior executed commands by GPU 14 (106). For instance, as GPU 14 completes executing commands, processor 12 utilizes statics about the workload of GPU 14 to determine a second clock rate.

As described above, assume there is a set of commands that includes include a group one of commands, a group two of commands, a group three of commands, and a group four of commands. In this example, processor 12 may have initially determined a first clock rate of 500 MHz (or a performance level of high-level, as another example), and GPU 14 may have set the frequency of oscillator 34 to 500 MHz before executing the commands. During execution of group one of the commands, processor 12 may determine the usage of GPU 14, and determine that only 50% of the cores of GPU 14 were utilized. As an example, upon the expiry of the tag associated with group one, processor 12 may determine the utilization of GPU 14. In turn, processor 12 may determine that a clock rate of 250 MHz is sufficient to meet the needs of timely execution.

In this previous example, the 500 MHz is the first clock rate, and 250 MHz is the second clock rate. Also, usage of GPU 14 was provided as one example of statistics that processor 12 may use to determine the clock rate. Processor 12 may utilize addition or other statistics as well, such as variance and trend. In some examples, processor 12 may continuously determine the second clock rate as more and more commands of the set of commands are executed.

Processor 12 may determine a third clock rate based on the first clock rate and the second clock rate (108). For instance, processor 12 may determine the third clock rate based on a weighted average of the first clock rate and the second clock rate. As another example, processor 12 may determine the third clock rate by initially weighting the first clock rate more heavily than the second clock rate and progressively increasing a weighting of the second clock rate during the execution of commands of the set of commands. In this way, the first clock rate may initially be the predominant factor, and the second clock rate determined from history of executed commands may progressively become a larger factor. For instance, processor 12 may continuously determine the second clock rate, which may fluctuate, and continuously determine the third clock rate based on the first clock rate and the continuously determined second clock rate.

Processor 12 may output the information indicating the third clock rate (110). Similar to the first clock rate, this information indicating the third clock rate may be a relative value, a fixed value, or a numerical value (as a few examples). For instance, if processor 12 indicated the first clock rate to be "higher," processor 12 may indicate the third clock rate to be "lower" to indicate a reduction in frequency or "higher" to indicate a further increase in the frequency. GPU 14 may then execute commands at the third clock rate, until GPU 14 receives information to further increase or to decrease its clock rate.

Figure 4:
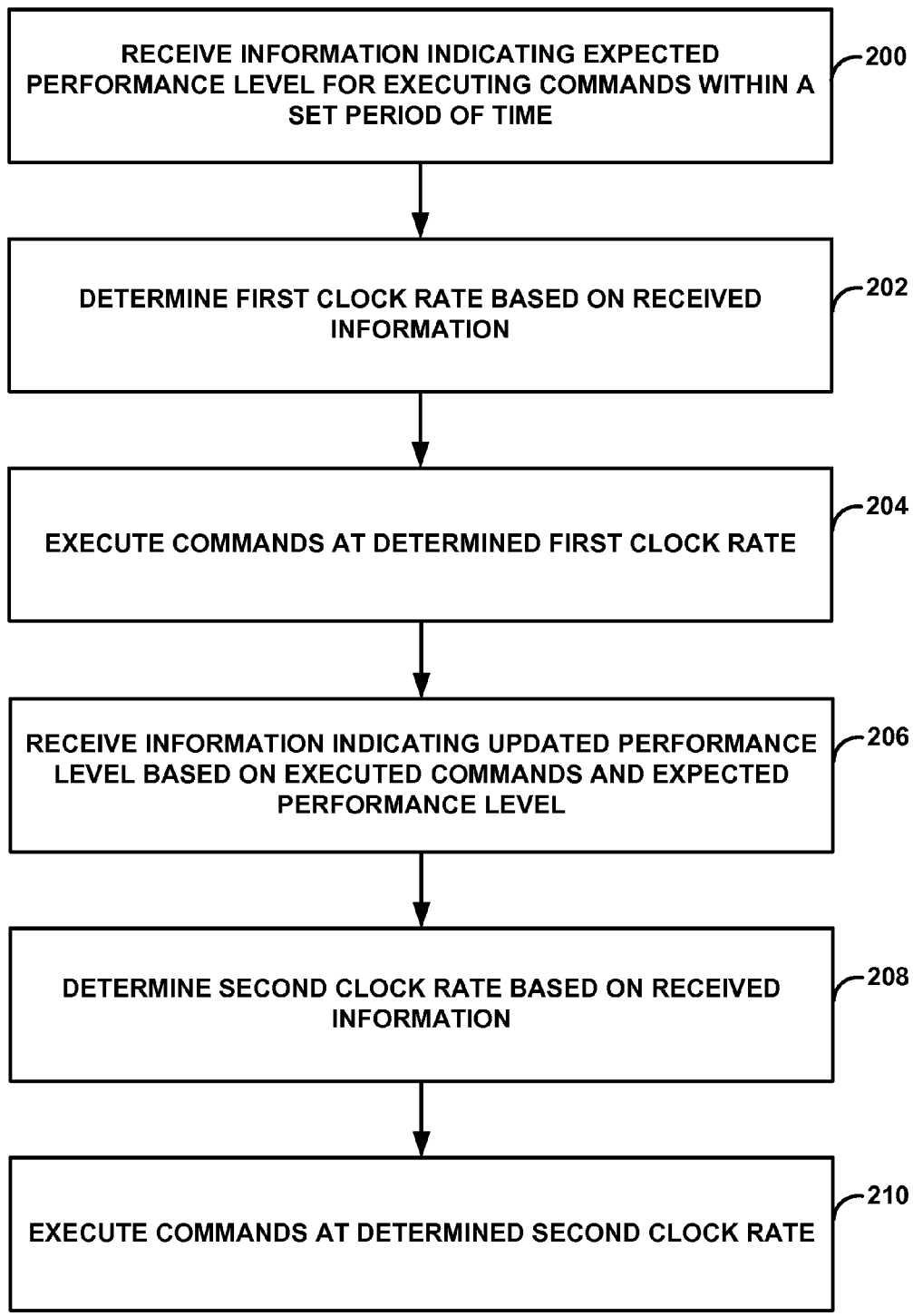
FIG. 4 is a flowchart illustrating an example operation of clock rate adjustment according to techniques described in this disclosure.

FIG. 4 is a flowchart illustrating an example operation of clock rate adjustment according to techniques described in this disclosure. As illustrated in FIG. 4, GPU 14 may receive information indicating an expected performance level of the GPU to execute a set of commands (200). The expected performance level is based on an amount of commands in the set of commands that GPU 14 is to execute within a set time period. In some examples, the received information may indicate a relative change in the performance level. For instance, the received information may indicate an increase or decrease in the performance level relative to a current performance level. In some examples, the received information may indicate an absolute performance level (e.g., maximum, high, medium, low, and minimum, where each level corresponds to a particular clock rate, or numerical value indicating a particular clock rate).

GPU 14 (e.g., via controller 30) may determine a first clock rate for oscillator 34 of GPU 14 based on the received information indicating the performance level prior to executing the commands of the set of commands (202). For example, GPU 14 may determine an increase in the clock rate based on the received information indicating an increase in the performance level or determining a decrease in the clock rate based on the received information indicating a decrease in the performance level. In some examples, GPU 14 may determine the clock rate based on the received information indicating the performance level prior to at least one of shader core 36 and units of a fixed-function pipeline 38 receiving the one or more commands of the set of commands.

GPU 14 may execute one or more commands of the set of commands at the first clock rate (204). In this way, GPU 14 may set the clock rate prior to executing the commands and based on the performance level, and then execute the commands at the clock rate.

During execution of the one or more commands, GPU 14 may receive information indicating an updated performance level that was determined based on a history of prior executed commands by GPU 14 (206). For instance, as GPU 14 completes executing commands, processor 12 utilizes statics about the workload of GPU 14 to determine a performance level.

GPU 14 may determine a second clock rate based on the information indicating the updated performance level (208). GPU 14 may execute one or more commands subsequent to the one or more executed commands of the set of commands at the determined second clock rate (110). In some examples, GPU 14 may continuously adjust the clock rate based on information received from processor 12. Accordingly, the clock rate at which GPU 14 executes subsequent commands may increase or decrease.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of clock rate determination comprising:
   determining, with a processor, an amount of commands in a set of commands that a graphics processing unit (GPU) needs to execute within a set period of time;
   determining a first clock rate for the GPU, prior to the GPU executing commands in the set of commands, based on the amount of commands in the set of commands;
   during execution of the commands in the set of commands, determining a second clock rate for the GPU based on a history of prior executed commands by the GPU;
   determining a third clock rate for the GPU based on a weighted average of the first clock rate and the second clock rate, wherein determining the third clock rate comprises initially weighting the first clock rate more heavily than the second clock rate in the weighted average and progressively increasing a weighting of the second clock rate in the weighted average during the execution of the commands of the set of commands;
   outputting information indicating the third clock rate to the GPU; and
   instructing the GPU to execute one or more commands of the set of commands.

2. The method of claim 1,
   wherein determining the amount of commands comprises one of determining an increase in the amount of commands or determining a decrease in the amount of commands, and
   wherein determining the first clock rate of the GPU comprises one of determining an increase in the clock rate at which the GPU needs to execute the commands in the set of commands based on determining the increase in the amount of commands, or determining a decrease in the clock rate at which the GPU needs to execute the commands in the set of commands based on determining the decrease in the amount of commands.

3. The method of claim 1, wherein determining the amount of commands comprises determining the amount of commands with one of an application executing on the processor that generates the commands or an operating system executing on the processor.

4. The method of claim 1, wherein outputting the information indicating the clock rate comprises:
   implementing a function call by a graphics driver; and
   outputting one or more instructions indicating an expected performance level in response to implementing the function call.

5. The method of claim 1, wherein determining the first clock rate comprises determining the first clock rate for the GPU prior to at least one of a shader core of the GPU or units of a fixed-function pipeline of the GPU receiving the one or more commands of the set of commands.

6. The method of claim 1, wherein the set of commands comprises a first set of commands, the method further comprising:
   determining an amount of commands in a second set of commands that the GPU needs to execute within the set period of time;
   determining a fourth clock rate for the GPU, prior to the GPU executing the commands in the second set of commands, based on the amount of commands in the second set of commands;
   outputting information indicating the fourth clock rate to the GPU; and
   instructing the GPU to execute one or more commands of the second set of commands.

7. A device for processing data comprising:
   a processor; and
   a graphics processing unit (GPU),
   wherein the processor is configured to:
      determine an amount of commands in a set of commands that the GPU needs to execute within a set period of time;
      determine a first clock rate for the GPU, prior to the GPU executing commands in the set of commands, based on the amount of commands in the set of commands;
      during execution of the commands in the set of commands, determine a second clock rate based on a history of prior executed commands by the GPU;
      determine a third clock rate based on a weighted average of the first clock rate and the second clock rate, wherein to determine the third clock rate, the processor is configured to initially weigh the first clock rate more heavily than the second clock rate in the weighted average and progressively increase a weighting of the second clock rate in the weighted average during the execution of the commands of the set of commands; and
      output information indicating the third clock rate to the GPU; and
   wherein the GPU is configured to:
      receive the information indicating the third clock rate;
      determine the third clock rate from the received information; and
      execute one or more commands of the set of commands at the third clock rate.

8. The device of claim 7, wherein the GPU comprises a shader core and units of a fixed-function pipeline, and wherein the GPU is configured to receive information indicating the third clock rate of the GPU prior to at least one of the shader core of the GPU or the units of the fixed-function pipeline of the GPU receiving the one or more commands of the set of commands.

9. The device of claim 7, wherein, to determine the amount of commands, the processor is configured to determine the amount of commands with one of an application executing on the processor that generates the commands or an operating system executing on the processor.

10. The device of claim 7, wherein, to output the information indicating the third clock rate, the processor is configured to:
   implement a function call by a graphics driver; and
   output one or more instructions indicating an expected performance level in response to implementing the function call.

11. A non-transitory computer-readable storage medium having instructions stored thereon that when executed cause a processor to:
   determine an amount of commands in a set of commands that a graphics processing unit (GPU) needs to execute within a set period of time;
   determine a first clock rate for the GPU, prior to the GPU executing commands in the set of commands, based on the amount of commands in the set of commands;
   during execution of the commands in the set of commands, determine a second clock rate based on a history of prior executed commands by the GPU;
   determine a third clock rate based on a weighted average of the first clock rate and the second clock rate, wherein the instructions that cause the processor to determine the third clock rate comprise instructions that cause the processor to initially weigh the first clock rate more heavily than the second clock rate in the weighted average and progressively increase a weighting of the second clock rate in the weighted average during the execution of the commands of the set of commands;
   output information indicating the third clock rate to the GPU; and instruct the GPU to execute one or more commands of the set of commands.

12. A device for processing data comprising:
   means for determining an amount of commands in a set of commands that a graphics processing unit (GPU) needs to execute within a set period of time;
   means for determining a first clock rate for the GPU, prior to the GPU executing commands in the set of commands, based on the amount of commands in the set of commands;
   means for determining a second clock rate for the GPU based on a history of prior executed commands by the GPU, during execution of the commands in the set of commands;
   means for determining a third clock rate for the GPU based on a weighted average of the first clock rate and the second clock rate, wherein the means for determining the third clock rate comprises means for initially weighting the first clock rate more heavily than the second clock rate in the weighted average and progressively increasing a weighting of the second clock rate in the weighted average during the execution of the commands of the set of commands;
   means for outputting information indicating the third clock rate to the GPU; and
   means for instructing the GPU to execute one or more commands of the set of commands.

\* \* \* \* \*